(12) United States Patent
Nagase

(10) Patent No.: US 8,041,382 B2
(45) Date of Patent: Oct. 18, 2011

(54) CELLULAR PHONE

(75) Inventor: Kazuhiro Nagase, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 461 days.

(21) Appl. No.: 12/261,200

(22) Filed: Oct. 30, 2008

(65) Prior Publication Data

US 2009/0156262 A1 Jun. 18, 2009

(30) Foreign Application Priority Data

Dec. 13, 2007 (JP) .............................. P2007-322011

(51) Int. Cl.
*H04M 1/00* (2006.01)
(52) U.S. Cl. .................. 455/550.1; 455/67.11; 455/516; 455/557
(58) Field of Classification Search .................. 455/566, 455/550.1, 516, 517, 466, 557, 455, 67.11, 455/551, 552.1; 370/474, 329, 338, 328, 370/320, 458
See application file for complete search history.

(56) References Cited

U.S. PATENT DOCUMENTS

| 6,920,152 | B1 * | 7/2005 | Chang et al. | 370/474 |
| 2007/0086379 | A1 * | 4/2007 | Takayanagi et al. | 370/329 |
| 2007/0153752 | A1 * | 7/2007 | Donnellan | 370/338 |
| 2009/0274101 | A1 * | 11/2009 | Sakoda et al. | 370/328 |

FOREIGN PATENT DOCUMENTS

| JP | 2005-057372 A | 3/2005 |
| JP | 2006-243829 A | 9/2006 |
| JP | 2007-081950 A | 3/2007 |

OTHER PUBLICATIONS

Japanese Office Action dated Dec. 15, 2009 (2 pages), issued in counterpart Japanese Application Serial No. 2007-322011.

* cited by examiner

*Primary Examiner* — John J Lee
(74) *Attorney, Agent, or Firm* — Maschoff Gilmore & Israelsen

(57) ABSTRACT

A cellular phone communicates data with an information provision apparatus connected via a packet network. A control unit obtains an information management apparatus identifier for identifying an information management apparatus within the packet network which is an intermediation at the time of the data communication carried out with the information provision apparatus further connected via an external network among the information provision apparatuses, determines whether the identifier added to the data at the time of the data communication is coincident with the information management apparatus identifier, and calculates a data amount at the time of the data communication carried out with the information provision apparatus connected via the external network. A storage unit stores the calculated data amount.

10 Claims, 7 Drawing Sheets

CELLULAR PHONE

BACKGROUND OF THE INVENTION

1. Field of the Invention

The present invention relates to a cellular phone. In particular, the invention relates to a cellular phone capable of browsing contents by using a full browser.

2. Description of the Related Art

In recent years, a cellular phone has been provided with, not only a communication function based on a simple call conversation, but also an address book function, a mail function via a network such as a base station and the Internet, a browser function with which web pages can be browsed, as well as multi media functions such as a music control function (music player function) with which audio data can be listened to and a function with which a terrestrial digital one-segment broadcast wave, a terrestrial digital radio broadcast wave, and an FM radio broadcast wave can be received.

In a case where the web pages, etc. are browsed by the cellular phone, by using a dedicated browser for the cellular phone, it is possible to browse a file described in a descriptive language developed for a mobile terminal (for example, WML (Wireless Markup Language) or HDML (Handheld Device Markup Language)). In recent years, higher functions of the cellular phone have been aimed. According to Japanese Unexamined Patent Application Publication No. 2006-243829, in addition no the dedicated browser for the cellular phone, the cellular phone has been also provided with a general full browser for the personal computer with which a file described in a descriptive language for a personal computer (for example, HTML (Hyper Text Markup Language) or XHTML (Extensible Hyper Text Markup Language)) can be browsed.

According to the technology proposed in Japanese Unexamined Patent Application Publication No. 2006-243829, it is possible to increase a usability of distribution for mobile terminals by representing a content for the personal computer in a different page structure.

In the personal computer used in a house or a business, in general, a broad band network capable of carrying out a high speed communication is used, and large volume data can be progressively communicated. Along with the spread of this broad band network, in order to realize a display of a beautiful image at a higher definition on the personal computer on the terminal side, the amount of data transmitted from a content, server becomes also larger. As a result, the data downloaded from the content server onto the personal computer by using the full browser is also larger.

However, in the case of the personal computer, a charge for the connection to the Internet is generally a flat-rate charge. On the contrary, in the case of the cellular phone, although depending on a service of carriers, the charge for the connection to the Internet is mainly a pay-as-you-go charge in accordance with the amount of communicated packets or a flat-rate charge which is more expensive than the charge for the usual mail of the cellular phone and the dedicated browser for the cellular phone. For that reason, the flat-rate charge is used in the case of the personal computer, and the usage fee is fixed irrespective of the total packet amount used by the full browser. Thus, the total packet amount used by the full browser is not so an important problem for the user. On the other hand, in the case of the cellular phone, the pay-as-you-go charge (or the flat-rate charge more expensive than the charge for the usual mail of the cellular phone and the dedicated browser for the cellular phone) is used, and the usage fee is charged in accordance with the total packet amount used by the full browser. Thus, the total packet amount used by the browser (full browser) becomes an important problem for the user, which directly links to the usage fee. For that reason, a check function of checking the total packet amount used by the full browser on a setting screen is mounted to the cellular phone.

At this time, in a case where data is browsed by using the full browser or the dedicated browser for the cellular phone in the cellular phone or a mail is transmitted or received, TCP (Transmission Control Protocol) is used as a communication protocol. In this TCP, in addition to a data part used by an application program of the highest application layer (for example, an application program related to the full browser), a header is added to the respective layers (the TCP layer/the IP layer/the data link layer, etc.). For that reason, in a case where the total data amount at the time of browsing the data by using the full browser is calculated, the total data amount takes different values depending on which protocol stack layer to be used to calculate the total data amount. Then, in general, a carrier calculates the total data amount on the basis of the data size of the IP layer, and the charge is calculated on the basis of the packet amount corresponding to the total data amount. For that reason, in a case where the total packet amount is calculated and the total packet amount is displayed in the cellular phone side, it is desirable to carry out the calculation by using, as a reference, the data size of the IP layer which the carrier uses for the charge calculation.

However, since the packet amount used for the communication of the application program other than the full browser such as the dedicated browser for the cellular phone or the mail software needs to be excluded from the packet amount used for the communication of the application program related to the full browser, the total packet amount is unwillingly calculated by the application program side in the related art. Thus, between the data size used for the charge calculation by the carrier due to the use of the full browser and the data size used for the charge calculation on the cellular phone due to the use of the full browser, some difference is generated. As a result, even though she total packet amount used by the full browser is the important problem for the user which directly links to the usage fee, it is difficult for the cellular phone side to precisely calculate the total packet amount used by the full browser, compared to the total packet amount calculated by the carrier.

SUMMARY OF THE INVENTION

The present invention to provide has been made in view of the above-mentioned situation, and it is an object of the invention to provide a cellular phone in which a total packet amount used by the browser (full browser) can be precisely calculated with respect to data size of an added header into account.

In order to solve the above-mentioned problem, according to an aspect of the present invention, there is provided a cellular phone, including: a communication unit configured to communicate data with information provision apparatuses which are connected via a packet network; an obtaining unit configured to obtain an information management apparatus identifier for identifying an information management apparatus within the packet network which is an intermediation at the time of the data communication with the information provision apparatus further connected via an external network among the information provision apparatuses; a determination unit configured to determine whether the identifier added to the data at the time of the data communication carried out by the communication unit is coincident with the information management apparatus identifier obtained by the obtaining unit; a calculation unit configured to calculate a data amount at the time of the data communication with the information provision apparatus which is connected via the external network; and a storage unit configured to store the data amount calculated by the calculation unit.

According to the aspect of the present invention, the total packet amount used by the browser (full browser) can be precisely calculated with respect to the data size of the added, header into account.

DESCRIPTION OF THE PREFERRED EMBODIMENTS

Hereinafter, embodiments of the present invention will be described with reference to the drawings.

First, before describing the embodiments of the present invention, a concept which is a precondition of the present invention will be described. In the case of a personal computer, a charge for the connection to the Internet is generally a flat-rate charge, but in the case of the cellular phone, although depending on a service of carriers, the charge for the connection to the Internet is mainly a pay-as-you-go in accordance with the amount of communicated packets. For that reason, the flat-rate charge is used in the case of the personal computer, and the usage fee is fixed irrespective of the total packet amount used by the full browser. Thus, the total packet amount used by the browser (full browser) is not so an important problem for the user. On the other hand, in the case of the cellular phone, the pay-as-you-go charge is used, and the usage fee is charged in accordance with the total packet amount used by the browser (full browser). Thus, the total packet, amount used by the browser (full browser) becomes an important problem for the user, which directly links to the usage fee.

Figure 1:
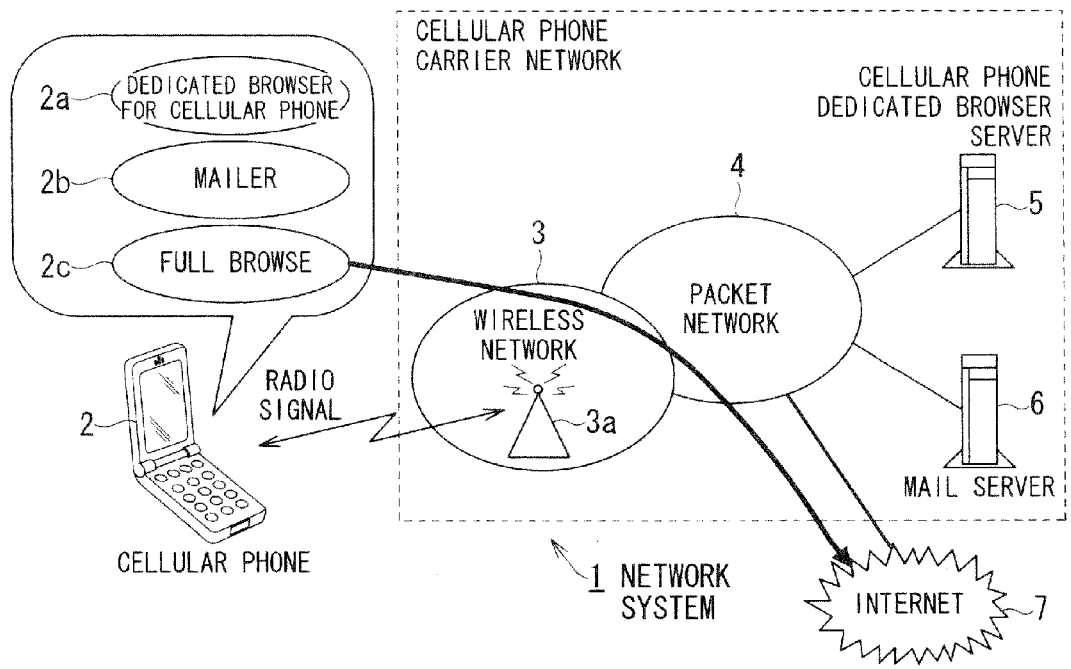
FIG. 1 is an explanatory diagram for describing a network system using a cellular phone.

FIG. 1 is an explanatory diagram for describing a network system 1 using a cellular phone 2. As illustrated in FIG. 1, at least an application program 2a related to a dedicated browser for the cellular phone, an application program related to a mail (mailer) 2b, and an application program 2c related to the full browser are mounted to a cellular phone 2. The cellular phone 2 is connectable to a base station 3a of a wireless network 3 via a radio signal. The wireless network 3 is connected to a packet network 4. Also, a cellular phone dedicated browser server 5 and a mail server 6 are further connected to the packet network 4 as a part of a cellular phone carrier network. Moreover, an Internet 7 functioning as an external network is further connected to the packet network 4. Various content servers are connected to the Internet 7. These content servers also include a content server for full browsing.

Figure 2A:
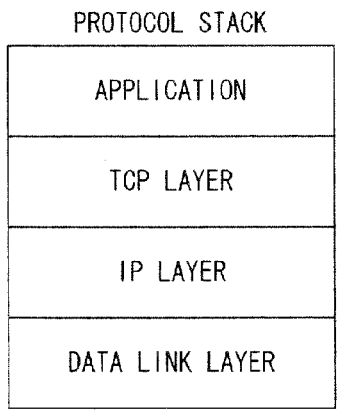
FIGS. 2A and 2B illustrate a stack structure of a communication protocol used in the cellular phone and a data structure.
Figure 2B:
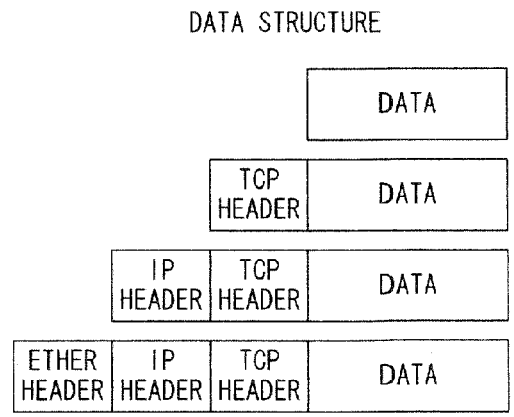

FIGS. 2A and 2B illustrate a stack structure of a communication protocol used in the cellular phone 2 and a data structure. As illustrated in FIG. 2A, in a case where data is browsed in the cellular phone 2 by using the browser (full browser), TCP (Transmission Control Protocol) is used as a communication protocol. In this case, she application layer exists as the highest layer. The stack structure is composed by stacking the TCP layer, the IP layer, and the data link layer in order.

As illustrated in FIG. 2B, in the cellular phone 2, according to this TCP, other than the data part used by the application program of the highest application layer (for example, the application program related to the full browser), a header is added to the respective layers (the TCP layer/the IP layer/the data link layer). For example, a TCP header is added to the TCP layer other than the original data part. For that reason, in the case where the total data amount at the time of browsing the data by using the browser (full browser) is calculated, the total data amount takes different values depending on which protocol stack layer to be used to calculate the total data amount. Then, in general, a carrier of the cellular phone 2 calculates the total data amount on the basis of the data size of the IP layer, and the charge is calculated on the basis of the packet amount corresponding to the total data amount. For that reason, in a case where the total packet amount is calculated and the total packet amount is displayed in the cellular phone 2, it is desirable to carry out she calculation by using, the data size of the IP layer which the carrier of the cellular phone 2 uses for the charge calculation.

Figure 3:
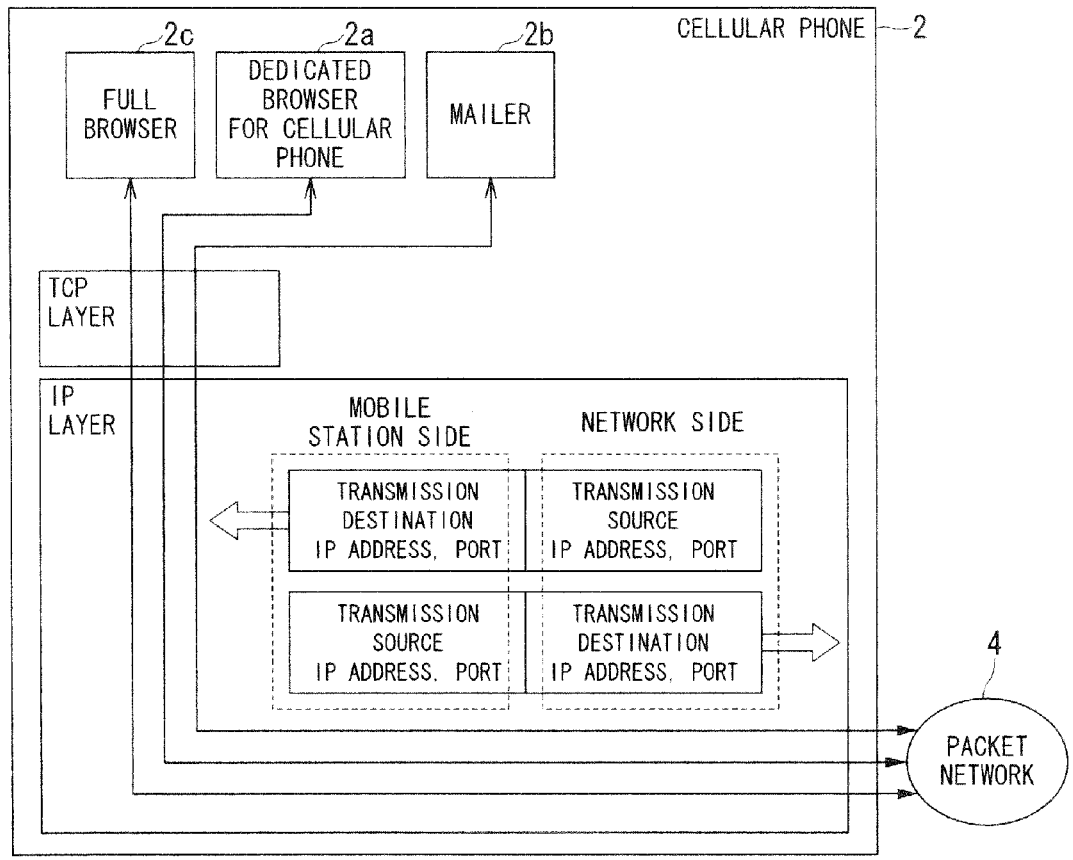
FIG. 3 is a conceptual diagram for describing a calculation method of calculating a charge based on use of a full browser on the cellular phone side in a related art.

However, as illustrated in FIG. 3, as the packet amount used for the communication of the application program other than the full browser such as the application program 2a related to the dedicated browser for the cellular phone or the mailer 2b needs to be excluded from the packet amount used for the communication of the application program 2c related to the full browser, the total packet amount is unwillingly calculated on the application program 2c related to the full browser in the related art. For that reason, between the data size used by the carrier of the cellular phone 2 for the charge calculation due to the use of the full browser and the data size used for the charge calculation on the cellular phone due to the use of the full browser, a difference by the amount of the headers in the respective layers illustrated in FIGS. 2A and 2B (by the amount of the IP header and the TCP header) is generated to some extent. As a result, even though the total packet amount used by the application program 2c related to the full browser is the important problem for the user which directly links to the usage fee, it is difficult for the cellular phone 2 to precisely calculate the total packet amount used by the full browser, compared to the total packet amount calculated by the carrier.

In view of the above, in order to eliminate the difference of the data amount at the time of the total packet amount calculation, in the case of calculating the total packet amount used by the full browser on the side of the cellular phone 2, the total packet amount is calculated in the IP layer. Hereinafter, a specific concept of calculating the total packet amount used by the full browser in the IP layer in the case of calculating the total packet amount on the cellular phone 2 will be described.

As illustrated in FIG. 3, in the IP layer, a transmission source/a transmission destination IP address/a Port number are used to carry out the communication. However, no data exists which can identify the application programs of the highest application layer (the application program 2a related to the dedicated browser for the cellular phone, the application program related to the mail (mailer) 2b, and the application program 2c related to the full browser) in the IP layer, and the communication based only on the full browser cannot be selected.

To be more specific, as illustrated in FIG. 3, the IP address on the mobile station side (the cellular phone 2 side) is allocated in unit of the cellular phone 2, and the same IP address is used for all the application programs in the highest application layer. Also, the Port number on the mobile station side (the cellular phone 2 side) is allocated for every communication, but the range of the Port numbers allocated to the respective application programs cannot be specified. Thus, it is difficult to identify the application program.

Figure 4:
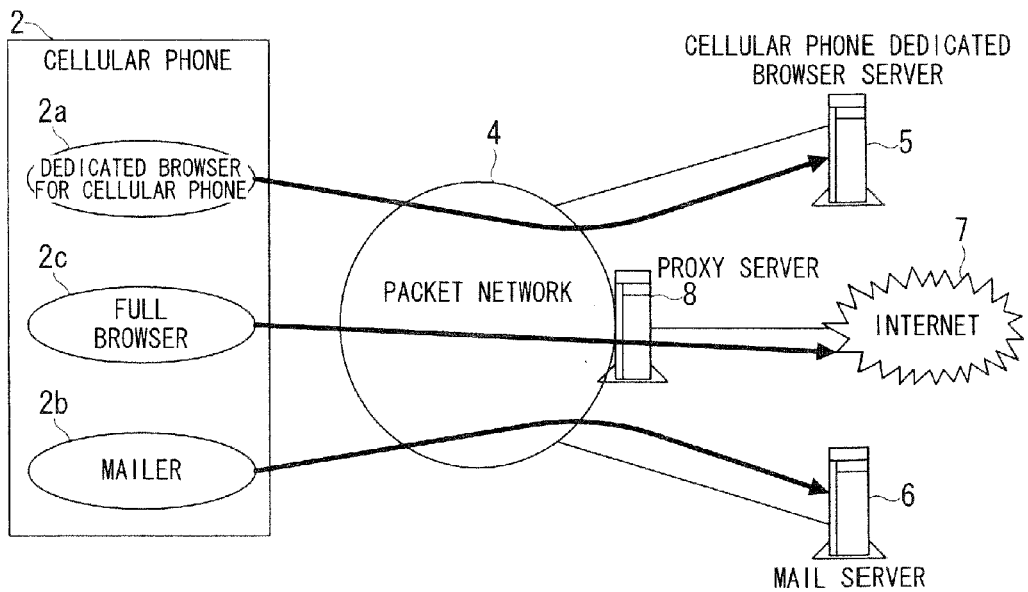
FIG. 4 is a conceptual diagram for describing a calculation method of calculating a charge based on use of a full browser on the cellular phone side according to an embodiment of the present invention.

Incidentally, as illustrated in FIG. 4, a proxy server 8 for connection to the Internet 7 exists in the packet network 4 in the carrier network. In order to carry out the communication while using the application program 2c related to the full browser, the communication needs to be carried out via the proxy server 8. On the other hand, the proxy server 8 is not used for the communication using the application program 2a related to the dedicated browser for the cellular phone or the mailer 2b other than the application program 2c related to the full browser.

Therefore, in the IP layer, by determining whether the IP address on the network side is the IP address of the proxy server 8, it is possible to determine whether the data to which the IP address of concern is added is the data related to the communication using the full browser 2c. As a result, it is possible to calculate the total packet amount used by the full browser 2c in the IP layer. With this configuration, the total packet amount used by the full browser 2c can be precisely calculated. Hereinafter, the embodiment of the present invention using this method will be described.

Figure 5A:
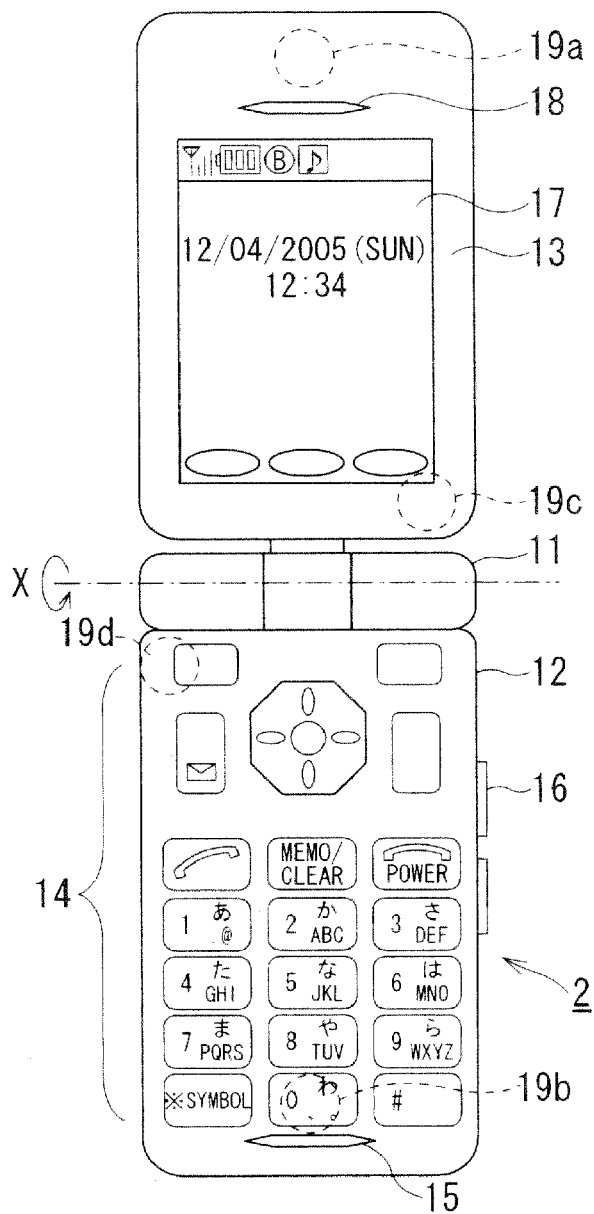
FIGS. 5A and 5B illustrate external appearance configurations of the cellular phone according to the embodiment of the present invention.
Figure 5B:
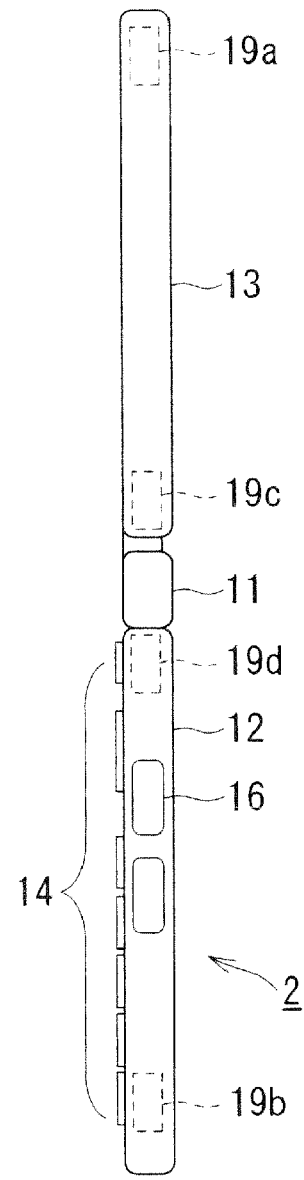

FIGS. 5A and 5B illustrate external appearance configurations of the cellular phone 2 which can be applied to an information processing apparatus according to an embodiment of the present invention. FIG. 5A illustrates an external appearance configuration of the cellular phone 2 opened at about 180 degrees as viewed from the front, and FIG. 5B illustrates an external appearance configuration of the cellular phone 1 opened as viewed from the side.

As illustrated in FIGS. 5A and 5B, the cellular phone 2 includes a first casing 12 and a second casing 13 which are hinge-connected with a hinge part 11 at the center. And, the cellular phone is formed so as to be foldable in an arrow X direction via the hinge part 11. At a predetermined location inside the cellular phone 2, an antenna for transmission and reception (an antenna 31 in FIG. 7 which will be described later) is provided. The cellular phone 2 may transmit and receive a radio wave with the base station 3a via the built-in antenna.

The first casing 12 is provided with operation keys 14 on its surface, such as alphanumeral keys from "0" to "9", an outgoing call key, a redial key, a power key, a clear key, and an electronic mail key. It is possible to input various instructions by using the operation keys 14.

The first casing 12 is provided with an arrow key and a confirm key as the operation keys 14 in an upper part. As a user operates the arrow key in up, down, left, and right directions, an allocated cursor can be moved in the up, down, left, and right directions. To be more specific, various operations are executed such as a scroll operation of a telephone directory list and an electronic mail displayed on a main display 17 provided to the second casing 13, a page turning over operation of a simplified home page, and an image feed operation.

In addition, various functions can be confirmed by pressing the confirm key. For example, in the first casing 12, in accordance with the operation of the arrow key by the user, a desired telephone number is selected from a plurality of telephone numbers in the telephone directory list displayed on the main display 17. When the confirm key is pressed in an inside direction of the first casing 12, the selected telephone number is confirmed and an outgoing call processing is performed for the telephone number.

Furthermore, the first casing 12 is provided with the electronic mail key on the left of the arrow key and the confirm key. When the electronic mail key is pressed in the inside direction of the first casing 12, it is possible to call mail transmission and reception functions. A browser key is provided on the right of the arrow key and the confirm key. When the browser key is pressed in the inside direction of the first casing 12, it is possible to view data of a Web page.

In addition, the first casing 12 is provided with a microphone 15 at a lower part of the operation keys 14. With the microphone 15, voice of the user at the time of conversation is collected. Also, the first casing 12 is provided with a side key 16 with which operations of the cellular phone 2 are carried out.

It should be noted that a battery pack is inserted to be attached on a back surface side of the first casing 12. When the power key is turned ON, electric power is supplied to the respective circuit units from the battery pack to activate the units in an operable state.

On the other hand, the second casing 13 is provided with the main display 17 on its front. In addition to the reception state of the radio wave, the battery remaining amount, other party names and telephone numbers registered as the telephone directory and the transmission history, the main display 17 can display the contents of the electronic mail, the simplified home page, an image picked up by a CCD (Charge Coupled Device) camera (a CCD camera 20 in FIGS. 6A and 6B which will be described later), a content received from an external content server, and a content stored in a memory card (a memory card 46 in FIG. 7 which will be described later). Also, a telephone receiver (earpiece) 18 is provided at a predetermined upper position of the main display 17. With this configuration, the user can perform the voice conversation. It should be noted that a speaker (not shown) as an audio output unit other than the telephone receiver 18 is provided at a predetermined position of the cellular phone 2.

Also, magnetic sensors 19a, 19b, 19c, and 19d for detecting the state of the cellular phone 2 are provided at predetermined positions inside the first erasing 12 and the second casing 13.

Figure 6A:
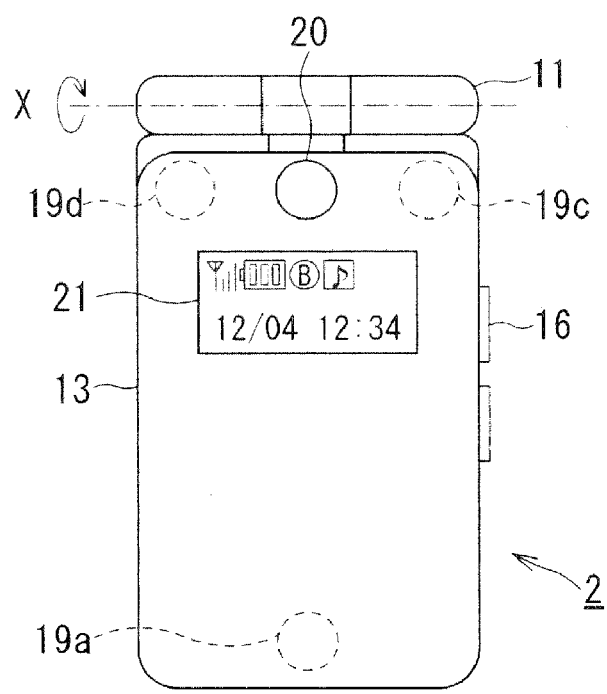
FIGS. 6A and 6B illustrate external appearance configurations of the cellular phone according to the embodiment of the present invention.
Figure 6B:
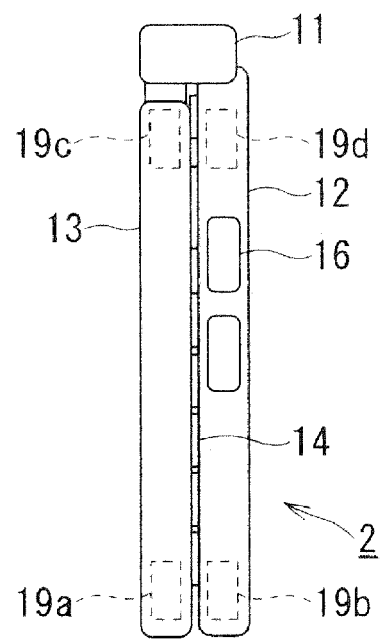

FIGS. 6A and 6B illustrate other external appearance configurations of the cellular phone 2 which can be applied to the information processing apparatus according to the embodiment of the present invention. A state of the cellular phone 2 in FIGS. 6A and 6B refers to a state in which the cellular phone 2 is turned from the stare in FIGS. 5A and 5B in an arrow X direction. FIG. 6A illustrates an external appearance configuration of the cellular phone 2 closed as viewed from the front, and FIG. 6B illustrates an external appearance configuration of the cellular phone 2 closed as viewed from the side.

At an upper part of the second casing 13, the CCD camera 20 is provided. With the CCD camera 20, it is possible to pick up an image of a desired photography target. A sub display 21 is provided at a lower part of the CCD camera 20. An antenna pictogram indicating the current antenna sensitivity, a battery pictogram indicating the current battery remaining amount of the cellular phone 2 and the current time are displayed on the sub display 21.

Figure 7:
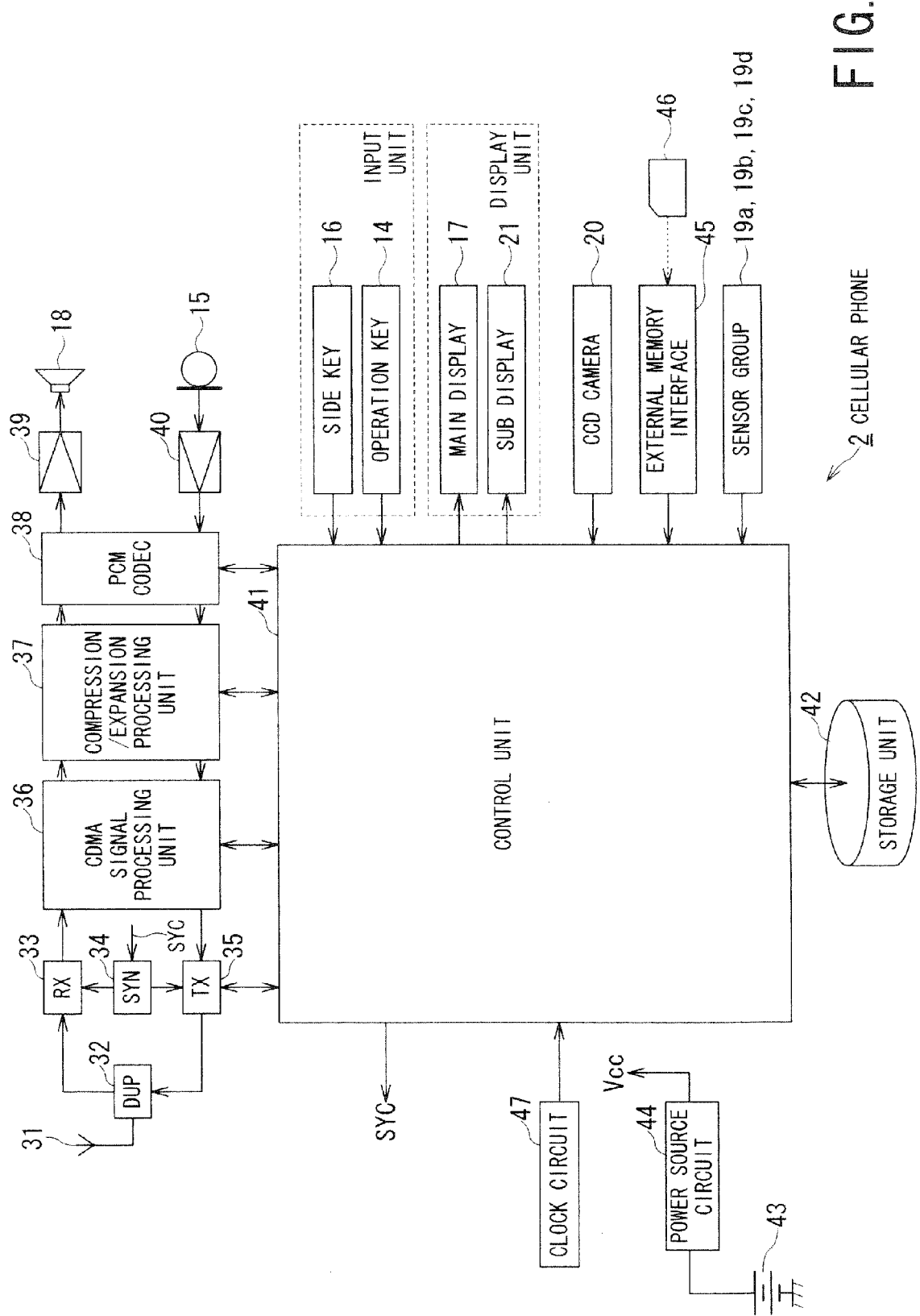
FIG. 7 is a block diagram of an internal configuration of the cellular phone according to the embodiment of the present invention.

FIG. 7 illustrates an inner configuration of the cellular phone 2 which can be applied to the information processing apparatus according to the embodiment of the present invention. A radio signal transmitted from the base station 3a is received by the antenna 31, and thereafter input to a receiver (RX) 33 via an antenna duplexer (DUP) 32. The receiver 33 may perform mixing of the received radio signal with a local oscillator signal output from a frequency synthesizer (SYN) 34 to down-convert the received radio signal into an intermediate frequency signal. Then, the receiver 33 generates a reception baseband signal by performing a quadrature demodulation (quadrature detection) on the down-converted intermediate frequency signal. The receiver 33 outputs the generated baseband signal to a CDMA signal processing unit 36. It should be noted that the frequency of the local oscillator signal generated from the frequency synthesizer 34 is instructed on the basis of a control signal SYC output from a control unit 41.

The CDMA signal processing unit 36 is provided with a RAKE receiver. The RAKE receiver despreads a plurality of paths included in the reception baseband signal with the respective spread codes (that is, the same spread code as the spread code of the spread reception signal). Then, after the phase in the despread signals of the respective paths is adjusted, the despread signals of the respective paths are coherently RAKE-combined by the RAKE receiver. The data series after the Rake combining is subjected to deinterleave and channel decoding (error correction decoding), and thereafter a binary data determination is carried out. With this configuration, it is possible to obtain reception packet data of a predetermined transmission format. The reception packet data is input to a compression/expansion processing unit 37.

The compression/expansion processing unit 37 is composed of a DSP (Digital Signal Processor). The compression/expansion processing unit 37 separates the reception packet data output from the CDMA signal processing unit 36 in a multiplexer/demultiplexer for each media, and perform a decoding processing on the separated data for each media. In the conversation mode, speech data corresponding to the conversation voice included in the reception packet data is decoded by way of speech codec. Also, like a television telephone mode, when motion image data is included in the reception packet data, the motion image data is decoded by way of video codec. Furthermore, when the reception packet data is a download content, after this download content is expanded, the expanded download content is output to the control unit 41.

The digital speech signal obtained through the decoding processing is supplied to a PCM codec 38. The PCM codec 38 may perform a PCM decoding on the digital speech signal output from the compression/expansion processing unit 37 and output the analog speech signal after the PCM decoding to a receiver amplifier 39. This analog audio signal is amplified by the call receiver amplifier 39 and thereafter output from the telephone receiver 18.

The digital motion image signal which decoded by way of the video codec through the compression/expansion processing unit 37 is input to the control unit 41. The control unit 41 displays the motion image based on the digital motion image signal output from the compression/expansion processing unit 37 on the main display 17 via a video RAM such as a VRAM. It should be noted that the control unit 41 can display not only the received motion image data but also the motion image data picked up by the CCD camera 20 on the main display 17 via the video RAM.

In a case where the reception packet data is the electronic mail, the compression/expansion processing unit 37 supplies the electronic mail to the control unit 41. The control unit 41 instructs a storage unit 42 to store the electronic mail supplied from the compression/expansion processing unit 37. Then, in accordance with the operation by the user on the operation keys 14 as the input unit, the control unit 41 reads out this electronic mail stored in the storage unit 42 and displays the read electronic mail on the main display 17.

On the other hand, in the conversation mode, the speech signal (analog speech signal) of the speaker (user) which input to the microphone 15 is amplified to an appropriate level by a transmitter amplifier 40, and then subjected to a PCM encoding by the PCM codec 38. The digital speech signal after the PCM encoding is input to the compression/expansion processing unit 37. Also, the motion image signal output from the CCD camera 20 is digitalized by the control unit 41 to be input to the compression/expansion processing unit 37. Furthermore, the electronic mail as text data generated by the control unit 41 is also input to the compression/expansion processing unit 37.

The compression/expansion processing unit 37 may perform a compression encoding on the digital speech signal output from the PCM codec 38 in a format in accordance with a predetermined transmission data rate. With this configuration, the speech data is generated. Also, the compression/expansion processing unit 37 performs a compression encoding on the digital motion image signal output from the control unit 41 to generate the motion image data. Then, the compression/expansion processing unit 37 multiplexes the audio data and the motion image data in the multiplexer/demultiplexer in accordance with a predetermined transmission format. The compression/expansion processing unit 37 packetizes the data multiplexed in the multiplexer/demultiplexer. The compression/expansion processing unit 37 outputs the transmission packet data after the packetization to the CDMA signal processing unit 36. In a case where the electronic mail is output from the control unit 41, the compression/expansion processing unit 37 multiplexes the electronic mail into the transmission packet data.

The CDMA signal processing unit 36 performs a spread spectrum processing on the transmission packet data output from the compression/expansion processing unit 37, with use of a spread code allocated to the transmission channel. Then, the CDMA signal processing unit 36 outputs the output signal after the spread spectrum processing to a transmitter (TX) 35. The transmitter 35 modulates the signal after the spread spectrum processing by using a digital modulation method such as a QPSK (Quadrature Phase Shift Keying) method. The transmitter 35 synthesizes the transmission signal after the digital modulation with the local oscillator signal generated from the frequency synthesizer 34 to up-convert the transmission signal into the radio signal. Then, the transmitter 35 performs a high frequency amplification on the radio signal generated, through the up-conversion so as to obtain the transmission power level which is instructed by the control unit 41. The radio signal having been subjected to the high frequency amplification is supplied to the antenna 31 via the antenna duplexer 32 and transmitted from the antenna 31 to the base station 3a.

In addition, the cellular phone 2 is provided with an external memory interface 45. The external memory interface 45 is provided with a slot to which the memory card 46 can be attached and detached. The memory card 46 is one type of flash memory cards represented by a NAND type flash memory card and a NOR type flash memory card. In the memory card 46, write and read of various data such as images, speech, and music can be performed via a ten-pin terminal. Furthermore, the cellular phone 2 is provided with a clock circuit (timer) 47 for measuring the current time.

The control unit 41 is composed of a CPU (Central Processing unit), a ROM (Read Only Memory) and a RAM (Random Access Memory). The CPU executes various processings while following programs stored in the ROM or various application programs loaded from the storage unit 42 to the RAM, and also generates various control signals to be supplied to the respective units, thus controlling the cellular phone 2 in an overall manner. The RAM appropriately stores data necessary for the CPU to execute the various processings.

The storage unit 42 is composed of a flash memory which is a non-volatile memory in which electrical rewrite and deletion can be performed, an HDD (Hard Disc Drive), or the like. The storage unit 42 stores the various application programs to be executed by the CPU of the control unit 41 or various data groups.

A power source circuit 44 generates a predetermined operation power source voltage Vcc on the basis of the output of a battery 43 to be supplied to the respective circuit units.

Figure 8:
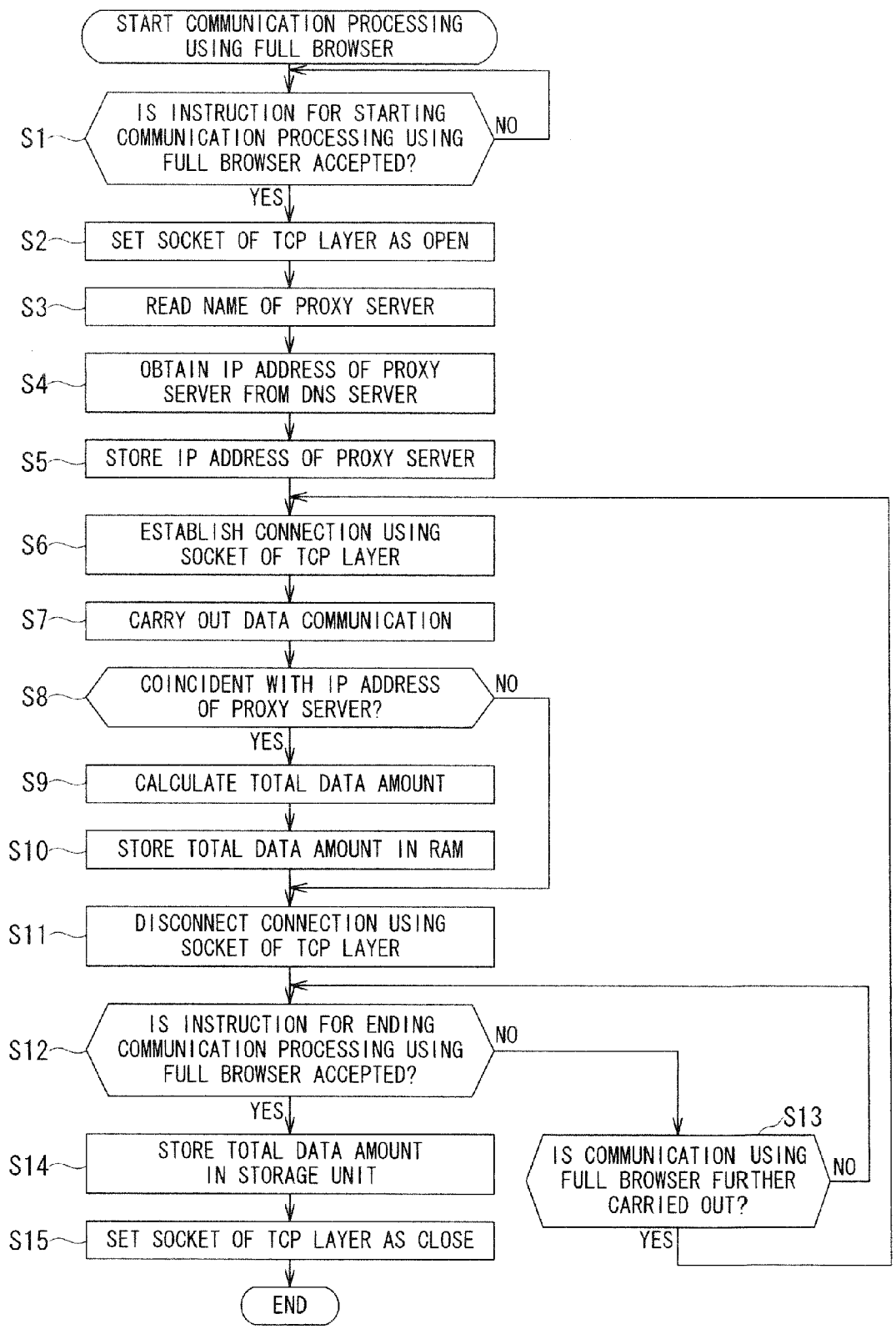
FIG. 8 is a flowchart for describing a communication processing using the full browser in the cellular phone of FIG. 7.

With reference to a flowchart in FIG. 8, a communication processing using the full browser 2c in the cellular phone 2 of FIG. 7 will be described. It should be noted that this communication processing using the full browser is started if an instruction for starting the communication processing using the full browser as the user operates the operation keys 14 is accepted.

In step S1, the control unit 41 determines whether the instruction for starting the communication processing using the full browser as the user operates the operation keys 14 is accepted, and the processing stands by until it is determined that the instruction for starting the communication processing using the full browser is accepted.

In step S1, in a case where the control unit 41 determines that the instruction for starting the communication processing using the full browser is accepted, in step S2, the control unit 41 activates and executes the application program 2c related to the full browser to open a socket of the TCP layer as a precondition for starting the communication processing using the full browser. In step S3, the control unit 41 reads out data related to a name of the proxy server 8 which has been already stored in the storage unit 42. It should be noted that if the data communication via the proxy server 8 is carried out once, the cellular phone 2 obtains the name of the proxy server 8, and the data related to the name of the proxy server 8 is stored in the storage unit 42.

In step S4, the control unit 41 uses the read data related to the name of the proxy server 8 to obtain the IP address of the proxy server 8 (for example, the IP address "123.456.789.123", etc.) from a DNS (Domain Name Server) server (not shown) existing inside the network of the carrier of the cellular phone 2 (for example, the packet network 4) via the wireless network 3 and the antenna 31. It should be noted that in some oases, every carrier of the cellular phone 2 may have a plurality of proxy server 8. In such a case, different proxy servers 8 may be used for each of the communication processing using the full browser. For that reason, in the processing in stop S4, it is not necessary to constantly obtain the same IP address.

In step S5, the control unit 41 temporarily stores (registers) the thus obtained IP address (for example, the IP address "123.456.789.123", etc.) in a RAM in the control unit 41. In step S6, the control unit 41 controls the antenna 31, the receiver 33 and the transmitter 35 to connect the socket of the TCP layer, and logically establishes the connection using the socket of the TCP layer.

In step S7, after the establishment of the connection using the socket of the TCP layer, the control unit 41 carries out the data communication (including the processing for both the transmission processing and the reception processing) with various content servers connected to the Internet 7 via the packet network 4 and the proxy server 8. In step S8, the control unit 41 determines whether the IP address added to the data in the data communication in the data communication processing in step S7 is coincident with the IP address of the proxy server 8 (for example, the IP address "123.456.789.123", etc.). That is, the control unit 41 determines whether among the data communication, the IP address of the transmission source is coincident with the IP address of the proxy server 8 (for example, the IP address "123.456.789.123", etc.) in the reception processing, and the IP address of the transmission destination is coincident with the IP address of the proxy server 8 (for example, the IP address "123.456.789.123", etc.) in the transmission processing.

In step S8, in a case where the control unit 41 determines that the IP address added to the data in the data communication in the data communication processing in step S7 is coincident with the IP address of the proxy server 8, in step S9, the control unit 41 calculates the total data amount communicated in the single data communication through addition in a counter on a RAM. In step S10, the control unit 41 stores the calculated total data amount in the RAM.

It should be noted that at the time of the data communication processing using the full browser 2c, even when the data communication processing using another application program such as the mailer 2b is simultaneously carried out, through the determination on the IP address added to the data in the data communication in the data communication processing, it is possible to at lease determine whether the data is the data in the data communication processing using the full browser 2c.

In step S8, in a case where the control unit 41 determines that the IP address added to the data in the data communication in the data communication processing in step S7 is not coincident with the IP address of the proxy server 8 (that is, for example, in a case where the data communication is carried out without an intermediation of the proxy server 8 by using the application program such as the dedicated browser 2a or the mailer 2b at the time of the data communication processing), the processing in steps S9 and S10 is skipped. With this configuration, the total data amount for the data communication carried out without the intermediation of the proxy server 8 is not calculated.

In step S11, after the completion of the single data communication processing, the control unit 41 controls the antenna 31, the receiver 33 and the transmitter 35 to disconnect the socket of the TCP layer, and logically disconnects the connection using the socket of the TCP layer.

in step S12, the control unit 41 determines whether an instruction for ending the communication processing using the full browser as the user operates the operation keys 14 is accepted. In step S12, in a case where the control unit 41 determines that the instruction for ending the communication processing using the full browser as the user operates the operation keys 14 is not accepted, in step S13, the control unit 41 determines whether the communication processing using the full browser is further carried out as the user operates the operation keys 14. In step S13, in a case where it is determined that the communication processing using the full browser is further carried out, the processing is returned to step S6, and the processing in step S6 and subsequent steps is repeatedly executed. That is, the connection using the socket of the TCP layer is logically established, and the new data communication processing is carried out. In a case where the data communication newly carried out is the data communication carried out via the proxy server 8, the total data amount including the newly carried out data communication is calculated, and the total data amount stored in the RAM is updated. It should be noted that in step S13, it is determined that the communication processing using the full browser is not further carried out, the processing is returned to step S12.

On the other hand, in step S12, in a case where the control unit 41 determines that the instruction for ending the communication processing using the full browser as the user operates the operation keys 14 is accepted, in step S14, the control unit 41 stores in the storage unit 42, the total data amount due to the data communication carried out so far which is stored in the RAM (not shown) of the control unit 41. In accordance with the control of the control unit 41, the storage unit 42 stores the total data amount due to the data communication carried out so far. In step S15, when the application program 2c related to the full browser which is activated and executed in step S2 and the communication processing using the full browser is ended, the control unit 41 closes the socket of the TCP layer.

Figure 9:
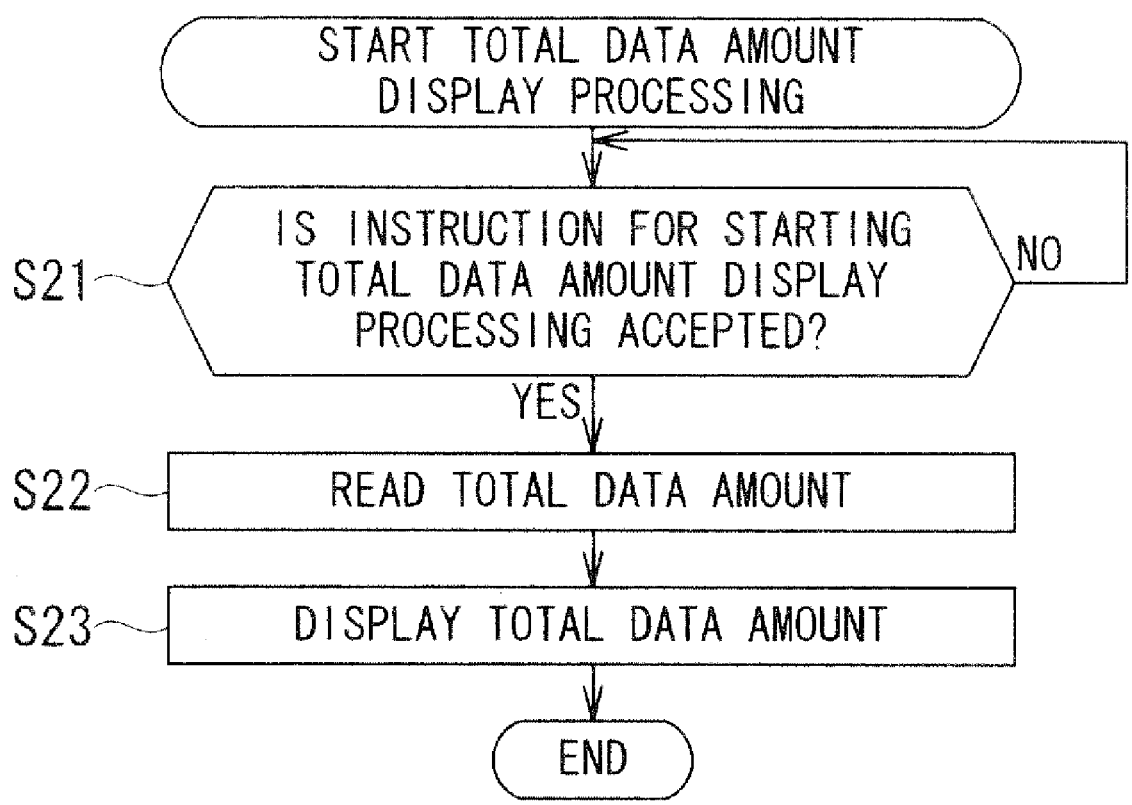
FIG. 9 is a flowchart for describing a total data amount display processing in the cellular phone of FIG. 7.

Next, with reference to a flowchart in FIG. 9, a total data amount display processing in the cellular phone 2 of FIG. 7 will be described. It should be noted that this total data amount display processing is started when an instruction for starting the total data amount display processing as the user operates the operation key 14 is accepted on a setting menu screen.

In step S21, the control unit 41 determines whether the instruction for starting the total data amount display processing as the user operates the operation key 14 is accepted on the setting menu screen, and the processing stands by until the instruction for starting the total data amount display processing is accepted on the setting menu screen.

In step S21, in a case where the control unit 41 determines that the processing stands by until the instruction for starting the total data amount display processing is accepted on the setting menu screen, in step S22, the control unit 41 reads out the total data amount stored in the storage unit 42. In step S23, the control unit 41 controls the main display 17 to display the read total data amount on the setting menu screen which is displayed on the main display 17. For example, the total data amount "xx KB" is displayed on the main display 17. Of course, depending on charge settings of carriers, not only the total data amount, but also a roughly calculated usage fee may be displayed.

According to the embodiment of the present invention, the data is communicated with the information provision apparatuses connected via the packet network 4 of the cellular phone 2 (for example, the cellular phone dedicated browser server 5 and the mail server 6, and the content server connected to the Internet 7). The information management apparatus identifier (the IP address of the proxy server 8) for identifying the information management apparatus within the packet network 4 (the proxy server 8) which is the intermediation at the time of the data communication carried out with the information provision apparatus further connected via the external network (the Internet 7) (the content server connected to the Internet 7) among the information provision apparatuses is obtained. The determination is performed as to whether the identifier added to the data at the time of the data communication (the IP address) is coincident with the thus obtained information management apparatus identifier. The data amount at the time of the data communication carried out with the information provision apparatus connected via the external network (the Internet 7) (the content server (not shown) connected to the Internet 7) is calculated, and it is possible to store the calculated data amount.

With this configuration, it is possible to calculate the total packet amount used by the full browser 2c in the IP layer, and the total packet amount used by the full browser 2c can be precisely calculated with reference to the data size of the headers added to the respective layers of the protocol into account. Also, through the display on the main display 17, the user can check the total packet amount used by the full browser 2c corresponding to the usage fee of the full browser 2c which is calculated in the carrier of the cellular phone 2. Therefore, it is possible to improve the usability at the time of carrying out the data communication while using the full browser 2c.

It should be noted that in addition to the cellular phone 2, the present invention can also be applied to other information processing apparatuses such as a PDA (Personal Digital Assistant), a personal computer, a portable game player, a portable music player, and a portable video player.

Also, the series of processings described according to the embodiment of the present invention can be executed by using software but can also be executed by using hardware.

Furthermore, according to the embodiments of the present invention, such a processing example that the steps of the flowcharts are processed in a time series manner in the stated order has been described, but the present invention also encompasses a processing in which the steps are not necessarily processed in the time series manner but the steps are processed in a parallel manner or individually processed.

What is claimed is:
1. A cellular phone, comprising:
   a communication unit configured to communicate data with plural information provision apparatuses which are connected via a packet network;
   an obtaining unit configured to obtain an information management apparatus identifier for identifying the information management apparatus within the packet network which is an intermediation at the time of the data communication with an information provision apparatus further connected via an external network among the plural information provision apparatuses;
   a determination unit configured to determine whether the information management apparatus identifier added to the data at the time of the data communication by the communication unit is coincident with the information management apparatus identifier obtained by the obtaining unit;
   a calculation unit configured to calculate a data amount at the time of the data communication with the information provision apparatus which is connected via the external network; and
   a storage unit configured to store the data amount calculated by the calculation unit.
2. The cellular phone according to claim 1, wherein the information management apparatus identifier and the identi- fier added to the data at the time of the data communication by the communication unit are an IP address in an IP layer.

3. The cellular phone according to claim 1, wherein in a case where the determination unit determines that the identifier added to the data at the time of the data communication carried out by the communication unit is coincident with the information management apparatus identifier obtained by the obtaining unit, the calculation unit calculates the data amount at the time of the data communication carried out with the information provision apparatus which is connected via the external network.

4. The cellular phone according to claim 1, wherein in a case where the determination unit determines that the identifier added to the data at the time of the data communication carried out by the communication unit is not coincident with the information management apparatus identifier obtained by the obtaining unit, the calculation processing by the calculation unit is not performed.

5. The cellular phone according to claim 1, wherein after the socket of the TCP layer is opened, each time the data communication is carried out with the information provision apparatus connected via the external network, the calculation unit calculates the data amount at the time of the data communication carried out with the information provision apparatus, and calculates the total data amount up until the socket of the TCP layer is closed.

6. The cellular phone according to claim 1, wherein after the socket of the TCP layer is opened, the obtaining unit obtains the information management apparatus identifier before the data communication is carried out by the communication unit.

7. The cellular phone according to claim 1, wherein the obtaining unit obtains the information management apparatus identifier, with use of a unique information related to the information management apparatus.

8. The cellular phone according to claim 7, wherein the unique information includes at least a name of the information management apparatus.

9. The cellular phone according to claim 1, wherein the information management apparatus is a proxy server within the packet network.

10. The cellular phone according to claim 1, further comprising a display unit configured to display the data amount stored by the storage unit or a charge corresponding to the data amount stored by the storage unit.

* * * * *